(12) United States Patent
Carmel et al.

(10) Patent No.: US 10,459,959 B2
(45) Date of Patent: Oct. 29, 2019

(54) TOP-K QUERY PROCESSING WITH CONDITIONAL SKIPS

(71) Applicant: Oath Inc., New York, NY (US)

(72) Inventors: David Carmel, Haifa (IL); Guy Gueta, Haifa (IL); Edward Bortnikov, Haifa (IL)

(73) Assignee: Oath Inc., New York, NY (US)

( * ) Notice: Subject to any disclaimer, the term of this patent is extended or adjusted under 35 U.S.C. 154(b) by 123 days.

(21) Appl. No.: 15/345,277

(22) Filed: Nov. 7, 2016

(65) Prior Publication Data

US 2018/0129731 A1    May 10, 2018

(51) Int. Cl.
*G06F 16/33* (2019.01)
*G06F 16/93* (2019.01)

(52) U.S. Cl.
CPC ............ *G06F 16/334* (2019.01); *G06F 16/93* (2019.01)

(58) Field of Classification Search
CPC ......... G06F 17/30675; G06F 17/30011; G06F 17/30696; G06F 17/30867; G06F 16/334; G06F 16/93
See application file for complete search history.

(56) References Cited

U.S. PATENT DOCUMENTS

| 2001/0044795 | A1* | 11/2001 | Cohen | G06F 17/30699 |
| 2003/0037034 | A1* | 2/2003 | Daniels | G06Q 10/087 |
| 2004/0243557 | A1* | 12/2004 | Broder | G06F 17/2785 |
| 2005/0055357 | A1* | 3/2005 | Campbell | G06F 8/61 |
| 2006/0287993 | A1* | 12/2006 | Yao | G06F 17/3053 |
| 2016/0189026 | A1* | 6/2016 | Marin | G06F 17/30864 706/31 |

OTHER PUBLICATIONS

Macdonald et al. (2011), Upper-bound approximations for dynamic pruning, ACM Transactions on Information Systems (TOIS), 29( 4), 17. (Year: 2011).*
Navarro et al. (Jun. 2012), Space-efficient top-k document retrieval, in International Symposium on Experimental Algorithms (pp. 307-319), Springer, Berlin, Heidelberg. (Year: 2012).*
Chen, Lei, et al. "Answering why-not questions on spatial keyword top-k queries" 2015 IEEE 31st International Conference on Data Engineering (ICDE), IEEE, 2015. (Year: 2015).*
Anh, Vo Ngoc et al., "Pruned query evaluation using pre-computed impacts," Proceedings of SIGIR '06, Aug. 6-11, 2006, pp. 372-379, ACM, 2006.
Broder, Andrei Z. et al., "Efficient query evaluation using a two-level retrieval process," Proceedings of CIKM '03, Nov. 3-8, 2003, pp. 426-434, ACM, 2003.

(Continued)

*Primary Examiner* — Jay A Morrison
(74) *Attorney, Agent, or Firm* — Cooper Legal Group, LLC (57) ABSTRACT

Methods and apparatus for performing top-k query processing include pruning a list of documents to identify a subset of the list of documents, where pruning includes, for other query terms in the set of query terms, skipping a document in the list of documents based, at least in part, on the contribution of the query term to the score of the corresponding document and the term upper bound for each other query term, in the set of query terms, that matches the document.

22 Claims, 5 Drawing Sheets

(56) References Cited

OTHER PUBLICATIONS

Buckley, Chris et al., "Optimization of inverted vector searches," Proceedings of SIGIR '85, pp. 97-110, ACM, Jun. 5-7, 1985, abstract.
Chakrabarti, Kaushik et al., "Interval-based pruning for top-k processing over compressed lists," Proceedings of ICDE, pp. 709-720, Apr. 11-16, 2011.
Culpepper, J. Shane et al., "Efficient in-memory top-k document retrieval," Proceedings of SIGIR '12, Aug. 12-16, 2012, pp. 225-234, ACM, 2012.
Daoud, Caio Moura et al., "Fast top-k preserving query processing using two-tier indexes," Information Processing and Management 52 (2016) 855-872, Mar. 27, 2016.
Dimopoulos, C. et al., "Optimizing top-k document retrieval strategies for block-max indexes," Proceedings of WSDM 2013, Feb. 4-8, 2013, pp. 113-122, ACM, 2013, abstract.
Ding, Shuai et al., "Faster top-k document retrieval using block-max indexes," Proceedings of SIGIR '11, Jul. 24-28, 2011, pp. 993-1002, ACM, 2011.
Fontoura, Marcus et al., "Evaluation strategies for top-k queries over memory-resident inverted indexes," Proceedings of the VLDB Endowment, 4(12):1213-1224, Aug. 29-Sep. 3, 2011.
Guy, Ido, "Searching by talking: analysis of voice queries on mobile web search," Proceedings of SIGIR, pp. 35-44, ACM, Jul. 17-21, 2016, abstract.
Konow, Roberto et al., "Dual-sorted inverted lists in practice," Proceedings of SPIRE, pp. 295-306, Springer-Verlag, Oct. 21-25, 2012.
Konow, Roberto et al., "Faster and smaller inverted indices with Treaps," Proceedings of SIGIR, pp. 193-202, Jul. 28-Aug. 1, 2013.
Macdonald, Craig et al., "Upper-bound approximations for dynamic pruning," ACM Trans. Inf. Syst., 29(4):17:1-17:28, Dec. 2011, abstract.
Moffat, Alistair et al., "Self-indexing inverted files for fast text retrieval," ACM Trans. Inf. Syst., 14(4):349-379, Oct. 1996, abstract.
Navarro, Gonzalo, "Wavelet trees for all," Journal of Discrete Algorithms, 25:2-20, Mar. 2014.
Persin, Michael, "Document filtering for fast ranking," Proceedings of SIGIR, Jul. 3-6, 1994, pp. 339-348, ACM, Oct. 1994, abstract.
Persin, Michael et al., "Filtered document retrieval with frequency-sorted indexes," Journal of the American Society for Information Science, 47(10):749-764, 1996, Jul. 1995.
Petri, Matthias et al., "Exploring the magic of WAND," Proceedings of ADCS '13, Dec. 5-6, 2013, pp. 58-65, ACM, 2013.
Rossi, Cristian et al., "Fast document-at-a-time query processing using two-tier indexes," Proceedings of SIGIR '13, Jul. 28-Aug. 1, 2013, pp. 183-192, ACM, 2013.
Seidel, Raimund et al., "Randomized search trees," Algorithimica, 16(4-5):464-497, Oct. 1996.
Shan, Dongdong et al., "Optimized top-k processing with global page scores on block-max indexes," Proceedings of WSDM, pp. 423-432, ACM, Feb. 8-12, 2012, abstract.
Strohman, Trevor et al., "Optimization strategies for complex queries," Proceedings of SIGIR '05, Aug. 15-19, 2005, pp. 219-225, ACM, 2005.
Teevan, J. et al., "#twittersearch: a comparison of microblog search and web search," Proceedings of WSDM, pp. 35-44, ACM, Feb. 9-12, 2011.
Turtle, Howard et al., "Query evaluation: strategies and optimizations," Inf. Process. Manage., 31(6):831-850, Nov. 1995, abstract.
Wang, Lidan, "A cascade ranking model for efficient ranked retrieval," Proceedings of SIGIR '11, Jul. 24-28, 2011, pp. 105-114, ACM, 2011.
Zobel, J. et al., "Inverted files for text search engines," ACM Comput. Surv., 38(2), Jul. 2006, abstract.

* cited by examiner

TOP-K QUERY PROCESSING WITH CONDITIONAL SKIPS

BACKGROUND OF THE INVENTION

The present disclosure relates generally to computer implemented methods and apparatus for processing search queries. More particularly, the disclosure relates to performing dynamic pruning during top-k query processing by search engines.

The search process applied by most modern search engines is usually based on two phases. In the first phase, a large subset of documents that "match" the query is scored by a simple and easy to compute scoring function. The top-k scored documents are extracted by a top-k query processing algorithm. Typically, the extracted list contains a few hundreds, or even thousands, of matching documents. In the second "re-ranking" phase, this extracted list is re-ranked using a complex scoring function that considers a rich set of features of the documents, the query, the context of the search process, and many other signals, in order to obtain a small ranked list of high-quality search results. This disclosure focuses on improving the first phase of the search process, by addressing a novel improvement for dynamic pruning methods for the top-k query processing algorithm.

SUMMARY OF THE INVENTION

Methods and apparatus for performing top-k query processing include dynamic pruning algorithms to identify a subset of documents to be evaluated from the full set of matching documents. Pruning is performed such that for each query term in the set of query terms, at least one document in the list of matching documents is skipped based, at least in part, on the contribution of the query term to the score of the corresponding document and the term upper bound for each other query term, in the set of query terms, that matches the document.

In another embodiment, a computing system includes a processor and a memory. The computing system may be configured to perform one or more of the disclosed method operations. In another embodiment, a computer readable storage medium has computer program instructions stored thereon that are arranged to perform one or more of the disclosed method operations.

These and other features of the disclosed embodiments will be presented in more detail in the following description and the accompanying figures.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Efficiency during top-k query processing applied during the first phase of the search process is harder to maintain as the size of the document collection becomes larger. Furthermore, efficiency is significantly affected by the query length, yet current user queries, especially on the Web, have become much longer due the high usage of query suggestion tools and query reformulation techniques.

The disclosed embodiments improve the efficiency of the top-k query processing applied by the first phase of the search process. The efficiency of top-k query processing is improved by applying dynamic pruning techniques which reduce the number of evaluated documents while identifying the top scored results. Example dynamic pruning algorithms for the top-k processing task will be described in further detail below. In accordance with various embodiments, these dynamic pruning algorithms may be improved through the use of an iterator that is capable of skipping documents that cannot belong to the final result list.

Top-k query processing is the task of identifying the top-k scored documents, out of a collection of documents, for a given query q and a given scoring function S(q, d). Documents are typically scored based on an estimation of their relevance to the query. We assume an additive scoring function, $$S(q; d) = ss(d) \times \sum_{t \in q \cap d} w(t) \times f(t, d),$$ Equation 1 where ss(d) is the query-independent static score of the document, which may be used, for example, for document length normalization and other document quality measurements, w(t) is the weight of the query term t, representing its relative importance in the query, and f(t, d) is the contribution of term t to the score of document d.

The evaluation process is typically based on an inverted index of the document collection. More particularly, each of the documents in the document collection may be identified using a corresponding document identifier (doc-id). A set of documents may be referred to as a postings list and each element (or posting) in the postings list may be represented by a corresponding document identifier. In one implementation, an inverted index may include a dictionary of terms (e.g., terms in a search query), where each term is associated with a postings list of elements representing all documents containing the term. A posting element is typically a tuple containing the doc-id (d), the term contribution to d's score (f(t, d)), and other information related to the term occurrence in the document (e.g., a list of the term offsets within the document, used for term proximity evaluation). Scoring a document d using such an index relates to identifying the posting elements of all query terms matching the query and summing their score contributions.

There are two main paradigms for scanning the documents matching the query. The term-at-a-time (TAAT) approach sequentially traverses the posting lists of the query terms, in a term-by-term manner, while documents scores are sequentially accumulated. The final document score is determined only after all query terms are processed. After completing the traversal of all lists, the k documents with highest accumulated score are extracted. Alternatively, in the document-at-a-time (DAAT) approach, all posting lists corresponding to the query terms are simultaneously scanned in parallel, and the score of a document is fully evaluated before moving to the next document. For DAAT based methods, all posting lists are sorted by the same key, typically by increasing doc-id.

In practice, both approaches suffer from a large number of matching documents per query that need to be scored in order to identify the top-k scored ones. Dynamic pruning techniques attempt to reduce the number of documents to be scored. Dynamic pruning methods may be classified as "safe" or "non-safe" methods. "Safe" methods guarantee that the top-k results are identical to the results of the corresponding non-pruned method, and are sorted by the same order. "Non-safe" methods are typically more efficient, but do not guarantee identical results or the same order.

In accordance with various implementations, a conditional iterator is applied in conjunction with a safe DAAT dynamic pruning method. As elements within the posting lists are processed, a cursor may point to the current element being processed or analyzed within a posting list. Thus, each term posting list may have a corresponding pointer or cursor that identifies the current posting element.

The inverted index may support the following posting traversal methods:

t.doc( ): returns the doc-id of the posting element that the term's cursor currently points to.

t.next( ): advances the cursor to the next element in the posting list of term t.

t.skip(d): advances the cursor to the first element in the posting list with document doc-id (d')>=doc-id (d).

Each query term has associated therewith a corresponding global upper bound on its potential contribution to the total score of any document in the index. Such an upper bound can be determined by traversal (e.g., offline) over the term's posting list to select the maximum entry, i.e., where the term's upper bound (UB)=w(t)×max$_d$(ss(d)×f(t; d)). If documents are split into n blocks, a term may have associated therewith an array of tighter block upper bounds, t.UB[1 . . . n], where each entry in the array bounds the term's contribution to all documents in the block.

Algorithms

Examples of four safe DAAT algorithms that may be applied for top-k query processing will be described in further detail below. All postings in the index may be sorted according to doc-id. For example, the elements in each of the postings may be sorted by increasing doc-id.

Top-k OR

The top-k OR algorithm traverses all matching documents to the query, i.e., all documents containing at least one query term, without any pruning. Algorithm 1 presents its pseudo code.

Algorithm 1:

```
1:  input:
2:    termsArray – Array of query terms
3:    k – Number of results to retrieve
4:  Init:
5:    for t ∈ termsArray do t:init()
6:    heap:init(k)
7:    θ = 0
8:    Sort(termsArray)
9:  Loop:
10:   while (termsArray[0].doc() < ∞) do
11:     d = termsArray[0].doc()
12:     i = 1
13:     while (i < numTerms ∩ termArray[i].doc() = d) do
14:       i = i + 1
15:     score = Score(d, termsArray[0...i – 1]))
16:     if (score >=θ _) then θ= heap.insert(d, score)
```

-continued

Algorithm 1:

```
17:         advanceTerms(termsArray[0...i−1])
18:         Sort(termsArray)
19:     Output: return heap.toSortedArray()
20:
21:     function advanceTerms(termsArray[0...pTerm])
22:         for (t ∈ termsArray[0...pTerm]) do
23:             if (t.doc() <= termsArray[pTerm].doc()) then
24:                 t.next()
```

In the above algorithm, θ represents the minimum heap value (e.g., the lowest score of the top matching documents, where the score represents the contribution of the term t to the document). TermsArray maintains an array of the query terms of a submitted search query.

The algorithm may begin with initializing the query terms, including initializing the terms' posting iterators i and setting the terms' global upper bounds. It may then initialize a min-heap of size k that accumulates the top-k scored results, and sort the terms in increasing order of their cursors (or pointers), which each points to their first matching document. The main loop scans over all matching documents; for each matching document it collects all matching terms (referred to as "pivot terms"). It then scores the document, following Equation 1, and pushes the document and its calculated score into the heap, using the heap.insert( ) method which returns the minimum value in the heap. After heap insertion, all pivot terms are advanced to their next posting element, and the terms are then re-sorted based on their updated cursor. Note that the algorithm does not take advantage of the skip( )iterator, the term upper bounds, or the minimum value in the heap.

Top-k MaxScore

The MaxScore algorithm is a safe algorithm with respect to OR, i.e., it returns the same top-k results in the same order as the OR algorithm that dynamically prunes the scanned posting list. The MaxScore algorithm categories the query terms as either "required" or "non-required." A document that contains non-required query terms but does not contain required query terms cannot belong to the final result list and thus can be skipped.

MaxScore maintains a max score value for each term which is the sum of all term upper bounds that are equal to or smaller than the term's upper bound. Thus, the max score value provides an upper bound on the contribution of the term to the score of a document containing this term. In addition, the max score value may provide an upper bound on the contribution of other terms to the score of the document, where the upper bounds of the other terms have smaller upper bounds than the upper bound for the term. If the max score of a term is smaller than θ, the minimum heap value (e.g., the minimum score of a document in the heap containing the current top-k documents), the score of a document containing only this term will not be inserted into the heap. Therefore, such a term is marked as "non-required." During the main loop, the algorithm only analyzes documents that contain at least one required term. After any heap update, the algorithm may check whether "required terms" are still categorized as "required."

Top-k WAND

WAND (standing for "weak, or weighted and") is another safe algorithm with respect to the OR algorithm. Similarly to MaxScore, it also analyzes the correspondence between term upper bounds and the heap minimum value. More particularly, at each stage, the algorithm searches for the "pivot" document defined as the first one with a potential score to be included in the final result set. It first identifies pivotTerm, the first term in the order that the sum of upper bounds of all preceding terms exceeds θ. If all terms behind pivotTerm match the pivot document, it is scored and pushed into the heap. Otherwise, one term behind the pivotTerm is selected and advanced up to the pivot document. Term selection may be performed by estimating the term with the farthest potential jump.

Top-k BMW

Block-Max Wand (BMW), an extension of WAND, keeps an additional array of block upper-bounds for each term, where each block upper-bound bounds the scores of all documents in a block of posting elements.

BMW identifies the pivot document exactly in the same manner as WAND. However, it additionally compares the sum of current block upper bounds of the matching terms with the minimum value in the heap, θ. The document will be evaluated only when the sum is larger than θ, otherwise the algorithm will search for the next pivot document. Since block upper bounds are naturally tighter than the global upper bounds, many more candidates will be skipped by BMW with respect to WAND. This improvement comes with the cost of additional memory used by BMW. While WAND keeps only one upper bound per term, BMW maintains two additional lists per term—one for keeping the block boundaries and the other for block upper bounds.

The Conditional-Skip Iterator

As discussed above, a variety of dynamic pruning algorithms may be applied during top-k query processing. However, these techniques require scoring a significant number of documents to identify the top-k documents that match a given query.

In accordance with various implementations, a conditional-skip iterator may be used in combination with a dynamic pruning technique to reduce the number of evaluated documents while identifying the top-k matching documents. The conditional-skip iterator conditionally skips documents in a term's posting-list. In one implementation, the conditional skip iterator, t.condSkip(d, θ) advances the cursor to the first element in the posting list with d'>=d or that f(t,d')>=θ.

The conditional skip iterator can be used to improve DAAT dynamic pruning algorithms, as will be described in further detail below.

Usage

Consider a one-term query q=t. Extracting the top-k scored documents can be done by scoring any document in the posting list corresponding to the term t and selecting the top-k scored documents. However, using the conditional skip iterator, large portions of the posting list can be skipped by repeatedly calling t.condSkip(∞, θ), where the minimum value θ in the min-heap is dynamically updated during traversal. The conditional-skip iterator will only consider documents with a score larger than θ, which becomes larger as we proceed through the list. The larger θ is, the larger the skip.

The iterator can also be used, in a similar manner, for multi-term queries. Assume q=<t1, . . . , tn>, where t1 is the most backward term (e.g., the term having a matching document with the lowest doc-id) and the cursor of t2, the next term in the order, is advanced farther. After the current document, t1.doc( ), has been handled, t1's cursor may be advanced. Since any document in the interval [t1.doc( )+1, t2.doc( )] can only match t1, we can safely call t1.condSkip (t2.doc( ), θ). The iterator will stop on a candidate preceding t2.doc( ) with a score larger than θ, while skipping all entries with a score lower than θ since they cannot be added to the heap.

In the following description, two different implementations of the conditional skip iterator are discussed. The first implementation is based on existing Application Programming Interfaces (APIs) for traversing the posting lists, while the second implementation is based on a TREAP data structure used to organize a posting list. The iterator implementations are independent of the search paradigms used to perform dynamic pruning. Therefore, the iterator can be applied by a variety of search paradigms for improved dynamic pruning.

Figure 1:
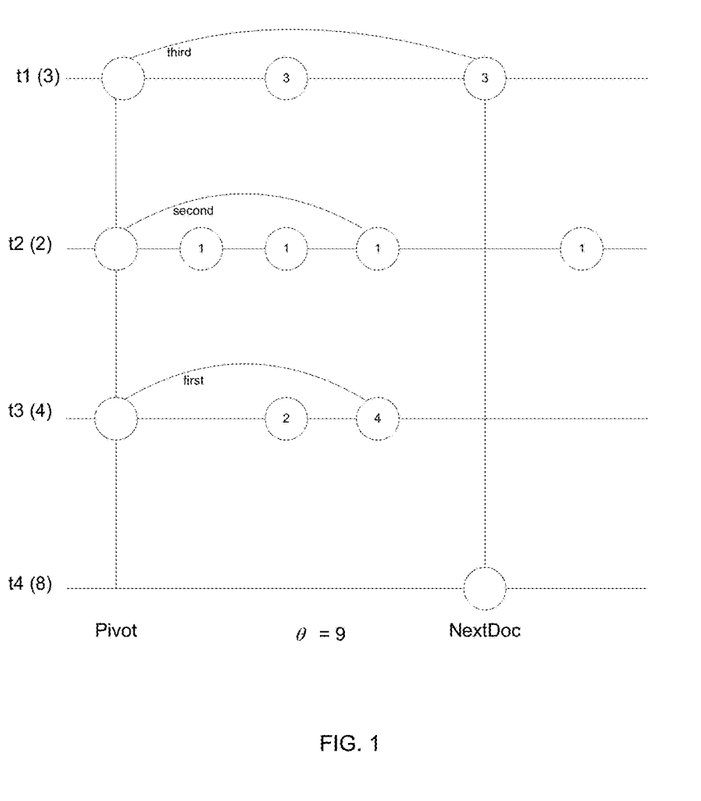
FIG. 1 is a diagram illustrating an example of an implementation of top-k query processing according to one embodiment.

The conditional-skip iterator can be used for modifying advanceTerms( ), the method called by all algorithms for advancing the documents associated with the pivot terms. FIG. 1 is a diagram illustrating the application of the conditional skip iterator by the modified method. In this example, the pivot document is the current document after being handled; <t1, . . . , t3> are the pivot terms, where each of the pivot terms is associated with its corresponding upper-bound; NextDoc is the next document pointed to by the cursor of the first term, and the current threshold θ=9. For simplicity we assume that w(t)=1 for all terms and ss(d)=1 for all documents.

In this example, the circles represent posting entries of posting lists of the respective pivot terms and the values within the circles represent f(t, d), the score representing the contribution of the term to the total score of the document. A posting entry in a term's posting list can be conditionally skipped if its score, together with the sum of each of the other pivot terms' upper-bounds, is lower than the threshold, θ.

Let t3 be the first term to advance. The sum of upper bounds of all pivot terms excluding t3, t3.othersUB=5. We can safely advance t3 with the call t3.condSkip(nextDoc; 4) since the score of any document d' in the interval [pivot+1, nextDoc), with f(t3, d')<4, is guaranteed to be less than θ=9, even if the document matches all pivot terms. Similarly, for the next term to advance, the sum of upper bounds of all pivot terms excluding t2, t2.othersUB=3. Hence, t2 can be safely advanced by calling t2.condSkip(nextDoc, 6). Since the scores of all documents preceding nextDoc in t2's list are less than 6, t2's cursor lands on the first entry prior to nextDoc.

Algorithm 2: Improving advanceTerms()
using the conditional-skip iterator

```
1:   function advanceTerms(termsArray[0...pT erm], θ, sumUB)
2:       if (pTerm + 1 < |termsArray|) then
3:           nextDoc = termsArray[pTerm + 1].doc()
4:       else
5:           nextDoc = ∞
6:       if (sumUB < θ) then
7:           for all (t ∈ termsArray[0...pTerm]) do
8:               t.skip(nextDoc)
9:       else
10:          nonSelected = |{t|t ∈ termsArray[0...pTerm]}
11:          repeat
12:              t = pickTerm(nonSelected)
13:              nonSelected = nonSelected − {t}
14:              othersUB = (sumUB − t.UB)
15:              newDoc = t.condSkip(nextDoc, θ− othersUB)
16:              if (newDoc < nextDoc) then
17:                  nextDoc = newDoc
18:              sumUB = othersUB
19:          until nonSelected = ∅
```

In one implementation, the order of term selection is determined according to increasing idf value.

Algorithm 2 is an example of code of the updated advanceTerms( ) method. θ represents the minimum value in the heap and sumUB represents the sum of the upper bounds of the pivot terms. First, the function determines nextDoc, the limit on advancing the pivot terms. If the sum of upper bounds is less than θ, all pivot terms may be advanced beyond nextDoc. Otherwise, a pivot term t is selected for advancing its cursor using the conditional-skip iterator.

OthersUB is set to be the sum of term upper bounds excluding the upper bound for the selected pivot term, t.UB. Then t can be advanced with the call t.condSkip(nextDoc, θ—othersUB). After the term's advancement, if the term t's cursor is behind nextDoc, t's cursor may be updated to become the new nextDoc. Finally, sumUB is decreased with t.UB as t cannot match any document behind nextDoc. The process ends after advancing all pivot terms.

Figure 2:
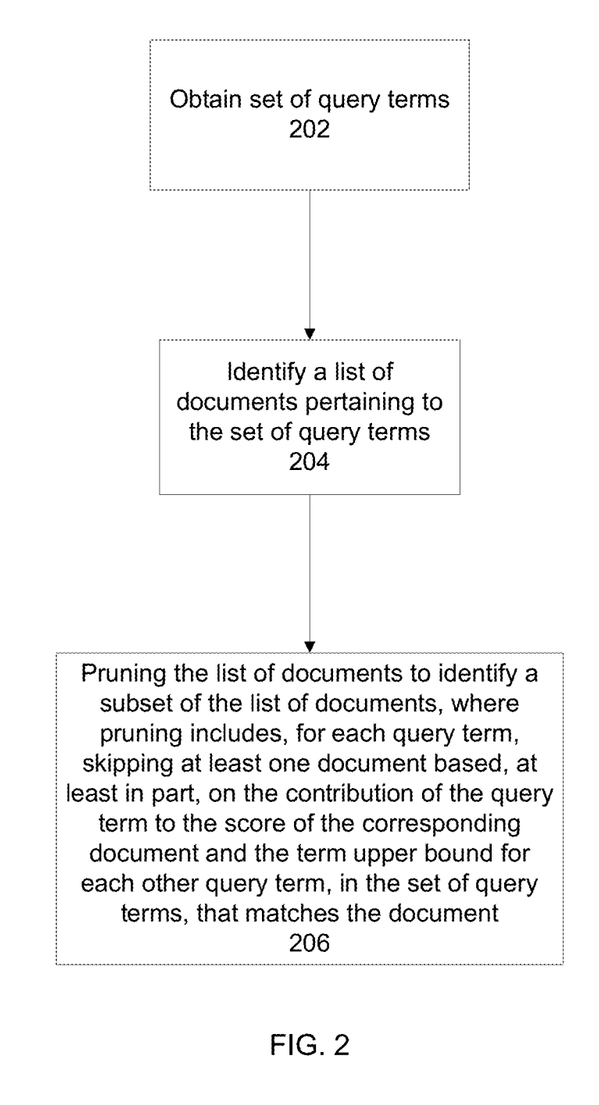
FIG. 2 is a process flow diagram illustrating an example method of performing top-k query processing according to various embodiments.

FIG. 2 is a process flow diagram illustrating an example method of performing top-k query processing according to various embodiments. After receiving a search query, the search query is parsed to obtain a set of query terms at 202. A list of documents pertaining to the set of query terms is identified at 204, wherein each document in the list of documents is associated with a corresponding document identifier. Each query term in the set of query terms has associated therewith a posting list of elements representing documents including the query term, where each element in the posting list indicates the corresponding document identifier and a contribution of the query term to a total score of the document. The contribution of the query term to the total score of the document may be referred to as the score, and may be represented by f(t, d). Each query term in the set of query terms has a corresponding term upper bound on its potential contribution to a document in the list of documents.

Prior to performing a dynamic pruning algorithm, the elements of each posting list may be sorted according to the corresponding document identifiers. As shown in FIG. 2, the list of documents is pruned to identify a subset of the list of documents at 206. More particularly, for each query term in the set of query terms, at least one document in the list of documents may be skipped based, at least in part, on the contribution of the query term to the score of the corresponding document and the term upper bound for each other query term, in the set of query terms, that matches the document. As set forth above, a query term that matches a document may also be referred to as a pivot term. For an element in a particular posting list, the score (e.g., the contribution of the query term to the total score of the corresponding document) and the term upper bound for each of the pivot terms (i.e., other query terms in the set of query terms that match the document) are added to ascertain a total. The element in the posting list may be skipped based, at least in part, on whether the total is lower than a threshold amount. As described above, the threshold amount is a lowest document score of the current set of top scored documents. Where a document is not skipped, the document may be added to the set of top scored documents.

In accordance with various implementations, an inverted index may be generated, where the inverted index includes, for each query term in the set of query terms, an associated posting list of elements representing documents including the query term. During top-k query processing, the list of documents may be pruned by traversing the inverted index.

In one implementation, the inverted index is generated, stored, and maintained using a TREAP data structure. The TREAP data structure is a tree data structure, where each node of the tree data structure corresponds to a heap of documents. The list of documents may be pruned by traversing the tree data structure.

Figure 3:
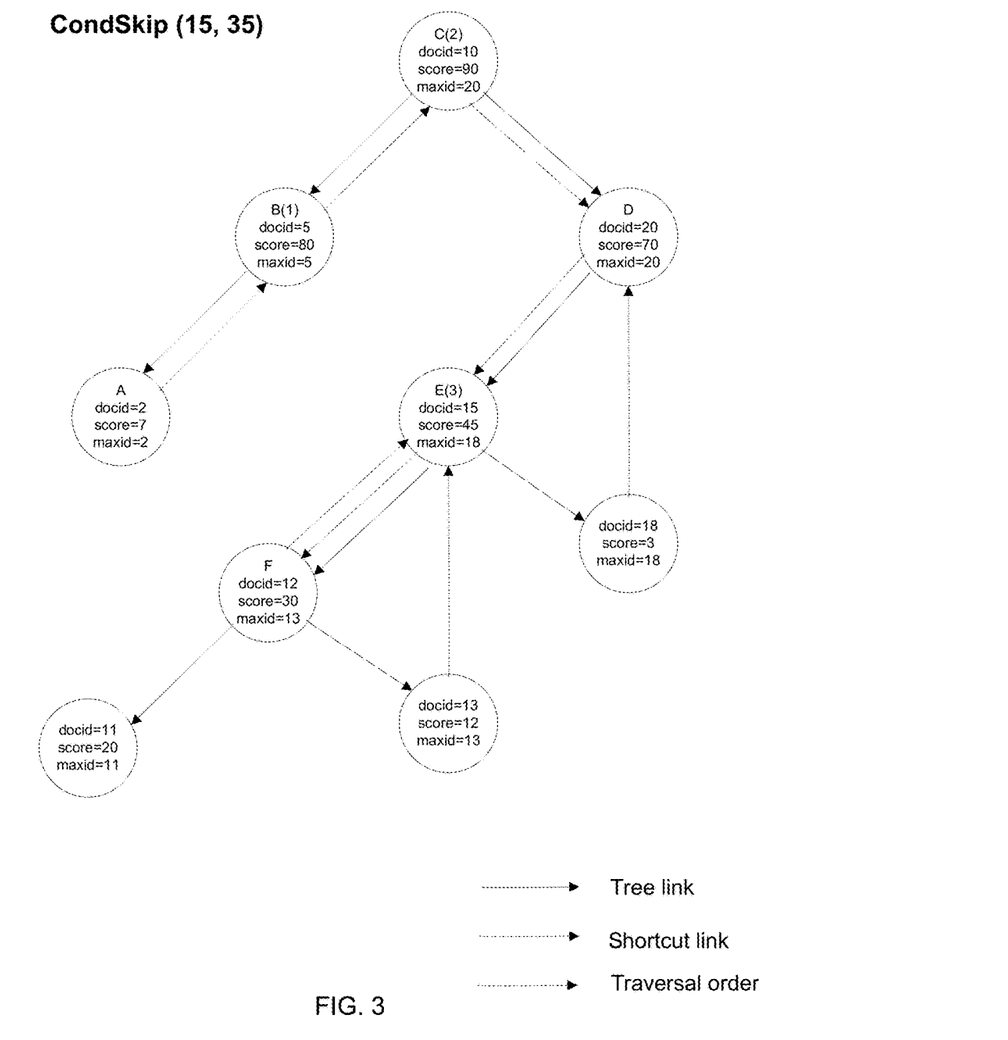
FIG. 3 is a diagram illustrating an example of an implementation of top-k query processing that uses a TREAP data structure.

FIG. 3 is a diagram illustrating an example of an implementation of top-k query processing that uses a TREAP data structure. As shown in FIG. 3, a TREAP data structure may be used to implement an index for a term's posting list. Each tree node may maintain a set of information associated therewith. The data is organized as a search tree by key and as a heap by priority. Each tree node maintains the doc-id as a key and the lowest score of the heap as priority. The priorities of each of the nodes of the subtrees of root u are less than or equal to the priority of root u.

In this example, the doc-ids of the documents serve as keys to the index, while the scores (representing the contribution of the term to the total score) serve as priorities. The posting element with the largest doc-id is selected as a root; all elements with smaller doc-ids form the left subtree, while all elements with larger doc-ids form the right subtree. More particularly, the root is selected to create a balanced tree by selecting the root as median. Each node represents one or more posting elements and maintains the largest doc-id among its elements, which have the same score.

The iterator may be initialized by pointing to the leftmost leaf node in the tree. Upon calling to t.condSkip( ), the iterator returns the next element in the growing order of doc-ids such that either its doc-id is greater or equal to d, or its score is greater or equal to $\tau$. As long as neither of the stopping conditions is met, the tree is traversed in-order by doc-id, while pruning the whole subtrees in which both the maximal score is smaller than $\tau$ and the maximal doc-id is smaller than the doc-id of the current document d. As an optimization, in-order shortcut links may be maintained that allow hopping to the next node while backtracking uptree.

In this example, the iterator performs a t.condSkip(d=15, $\tau$=35) starting from the leftmost node. It returns, in turn, the nodes B, C, and E. In this example, the entire subtree rooted by F is skipped because both the maximal score of the subtree is 30 (which is less than or equal to $\tau$), and the maximal doc-id is 13 (which is less than or equal to 15). Pre-iteration, node C's score is the dynamic upper bound of the list; post-iteration, it is surpassed, hence node D's score is the new upper bound.

In addition to the basic iteration, the TREAP provides a dynamic upper bound (t.dUB( )) on the scores of non-traversed yet nodes, to support further optimization. Initially, dUB( ) returns the root node's score. Once the iteration surpasses that node, t.dUB( ) is updated to return its right son's score. FIG. 3 illustrates a tree traversal, including subtree pruning and dUB( ) update.

Since the TREAP nodes hold fixed-sized values (integers and references), the entire structure can be easily embedded in linear (array) storage, similarly to standard posting list implementations. In one implementation, the TREAP overhead is captured by 64 bytes per posting entry, thus roughly doubling the in-memory storage used for maintaining a term's posting list. As all linear layouts, it is amenable to state-of-the-art gap encoding algorithms that optimize storage space. In addition, the TREAP structure enables significant forward jumps within the list.

In some implementations, the TREAP index can provide tighter dynamic term upper bounds that selectively replace the global term upper bounds used by all pruning algorithms, thereby bringing an additional pruning power to the search process. For example, for BMW, the advanceTerms( ) method can be modified to take advantage of the tighter block upper bounds. More particularly, the modified version may receive two additional parameters, the minimum block boundary of all pivot terms, minBlockBoundary, and the sum of their current block upper bounds, sumBlockUB. If the score associated with nextDoc<=minBlockBoundary, i.e. the interval for potential skips of the pivot terms is covered by each of the current blocks, the global upper bounds may be replaced with the block upper bounds. For example, in the Algorithm 2, line 14 may be replaced with othersUB=(sumBlockUB—t.UB[t.currentBlock]). Alternatively, where the blocks do not cover the whole interval, the conditional-skip iterator may be applied with the global upper bounds.

While the original dynamic pruning algorithms advance each of the pivot terms independently to its next entry, the modified advanceTerms( ) method advances the term's cursor while considering the status of all other pivot terms. This consideration enables better skips as many matching documents can be safely skipped when the sum of upper bounds of other potential matching terms is lower than the current heap threshold.

The conditional skip iterator may be applied to datasets generated as a result of using queries of varying length. The integration of the iterator saves a significant amount of computation. Through the use of the iterator, the number of evaluated documents and run-time latency may be significantly reduced.

Network Environment

Figure 4:
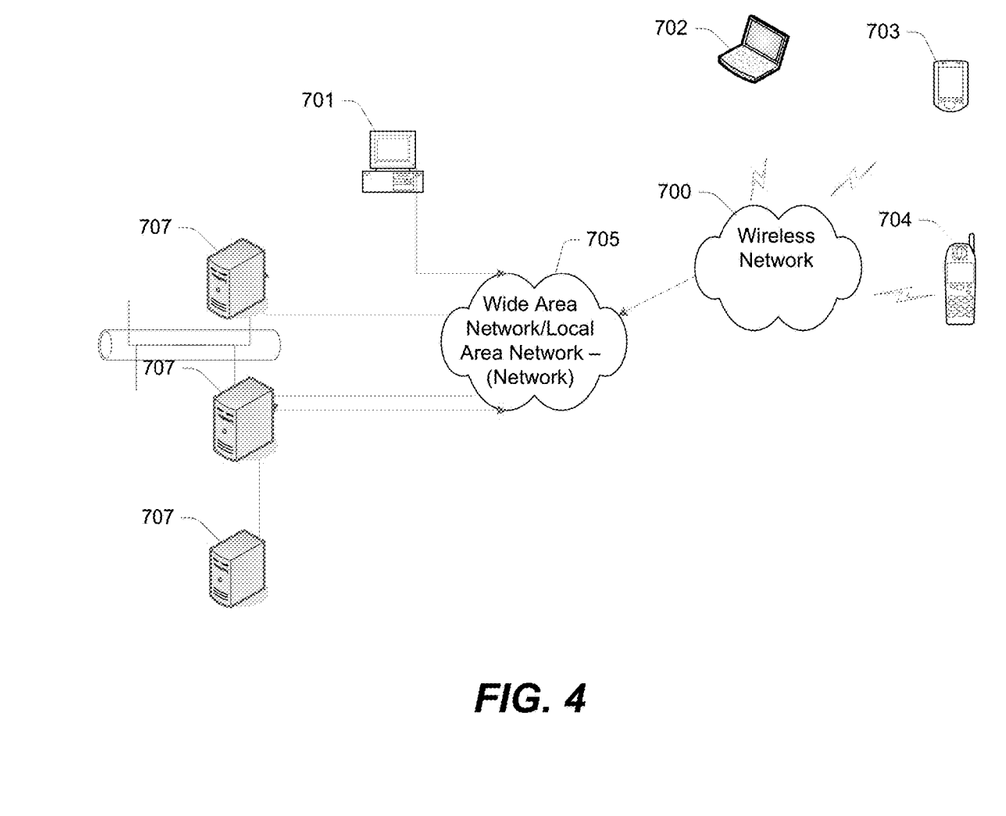
FIG. 4 is a schematic diagram illustrating an example embodiment of a network in which various embodiments may be implemented.

The disclosed implementations may be implemented in any of a wide variety of computing contexts. FIG. 4 is a schematic diagram illustrating an example implementation of a network. Other implementations that may vary, for example, in terms of arrangement or in terms of type of components, are also intended to be included within claimed subject matter.

Implementations are contemplated in which users interact with a diverse network environment via any type of computer (e.g., desktop, laptop, tablet, etc.), media computing platforms (e.g., cable and satellite set top boxes and digital video recorders), handheld computing devices (e.g., PDAs), cell phones, or any other type of computing or communication platform.

As shown, FIG. 4, for example, includes a variety of networks, such as a LAN/WAN 705 and wireless network 700, a variety of devices, such as client devices 701-704, and a variety of servers 707 such as content server(s), a web server, and/or a search server. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed implementations may be implemented in some centralized manner. This is represented in FIG. 4 by server(s) 707, which may correspond to multiple distributed devices and data store(s). For example, a search server may receive a search query including one or more search terms via network 700 from any of client devices 701-704. The server(s) 707 may be further configured to operate according to various implementations described herein to identify a set of top-k documents matching the search query. Upon further processing, at least a subset of the top-k documents may be returned to requesting client device(s) 701-704.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content items may be identified and retrieved via a content distribution network. A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Services may also be provided in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

The network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various implementations may be employed via one or more servers. A computing device that is capable of sending or receiving signals, such as via a wired or wireless network, or capable of processing or storing signals, such as in memory as physical memory states, may operate as a server. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content items may be identified or provided via a content server. A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOW) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 5:
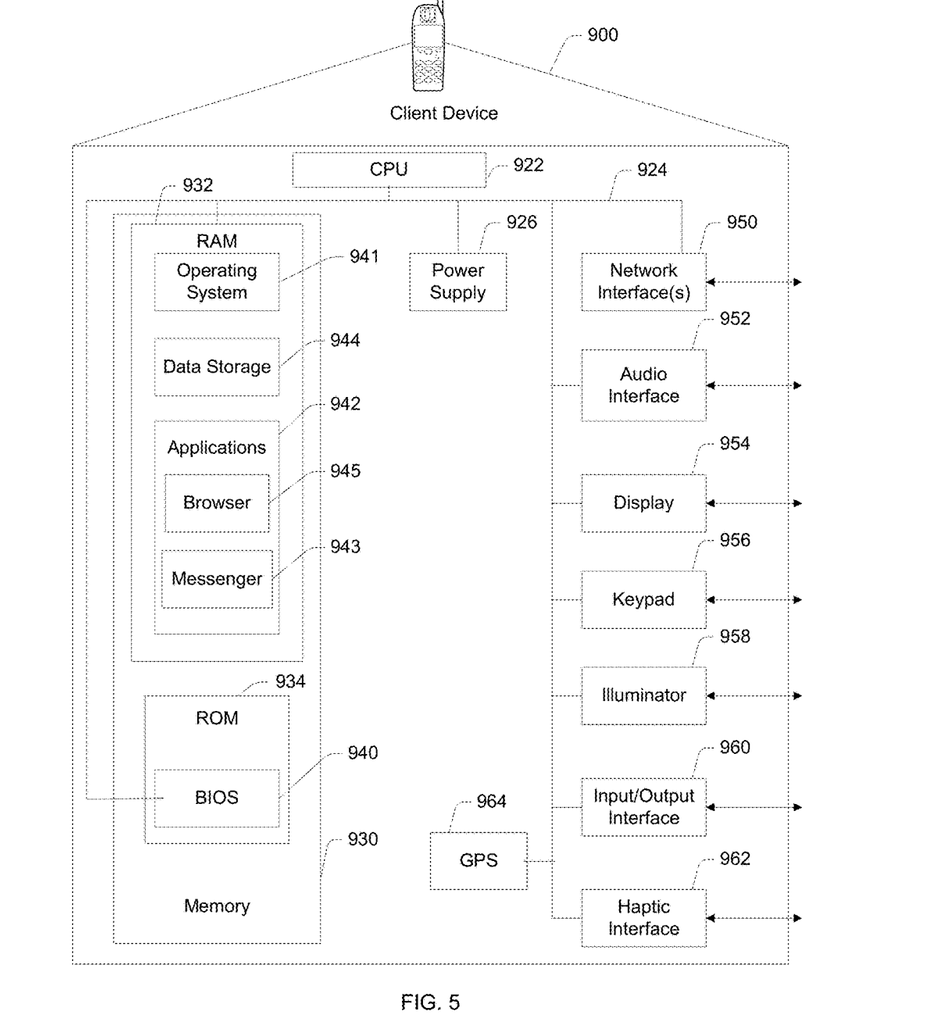
FIG. 5 is a diagram illustrating an example client device in which various embodiments may be implemented.

FIG. 5 is a schematic diagram illustrating an example implementation of a client device in which various implementations may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 900 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various implementations, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some implementations, an identity of the user (e.g., owner) of the client device may be statically configured. Thus, the device may be keyed to an owner or multiple owners. In other implementations, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. For example, the program instructions may control the operation of one or more applications. The memory or memories may also be configured to store instructions for performing the disclosed methods, graphical user interfaces to be displayed in association with the disclosed methods, etc.

Because such information and program instructions may be employed to implement the systems/methods described herein, the disclosed implementations relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various implementations are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. An apparatus and/or web browser may be specially constructed for the required purposes, or it may be a general-purpose computer selectively activated or reconfigured by a computer program and/or data structure stored in the computer.

The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing implementations have been described in some detail for purposes of clarity of understanding, it will be apparent that certain changes and modifications may be practiced within the scope of the appended claims. Therefore, the present implementations are to be considered as illustrative and not restrictive and the invention is not to be limited to the details given herein, but may be modified within the scope and equivalents of the appended claims.

What is claimed is:

1. A method, comprising:
obtaining, by one or more servers, a set of query terms of a search query;
identifying, by the one or more servers, a list of documents pertaining to the set of query terms, wherein each document in the list of documents is identified by a document identifier, wherein each query term in the set of query terms has associated therewith a posting list of elements representing documents including the query term, wherein each element in the posting list indicates the corresponding document identifier and a contribution of the query term to a score of the document, and wherein each query term in the set of query terms has a corresponding term upper bound on its potential contribution to at least one document in the list of documents;
organizing the list of documents using a tree data structure, each of a plurality of nodes of the tree data structure representing a corresponding document heap of a plurality of document heaps; and
pruning, by the one or more servers, the list of documents to identify a subset of the list of documents, wherein pruning includes, for each query term in the set of query terms, skipping a document in the list of documents based, at least in part, on the contribution of the query term to the score of the corresponding document and a term upper bound for each other query term, in the set of query terms, that matches the document, wherein pruning includes traversing the tree data structure.

2. The method of claim 1, further comprising:
for a query term in the set of query terms:
for an element in the corresponding posting list,
summing the contribution of the query term to the score of the corresponding document and a term upper bound for each other query term, in the set of query terms, that matches the document to ascertain a total; and
skipping the element within the corresponding posting list according to whether the total is lower than a lowest document score of a set of top scored documents of the list of documents.

3. The method of claim 2, further comprising:
updating the set of top scored documents to include the document based, at least in part, on the total.

4. The method of claim 1, further comprising:
for a query term in the set of query terms:
summing a term upper bound for each of the other query terms in the set of query terms to ascertain a total; and
skipping an element within the corresponding posting list based, at least in part, on whether the total is lower than a lowest document score of a set of top scored documents of the list of documents.

5. The method of claim 1, each of the document heaps corresponding to a different set of one or more documents in the list of documents.

6. The method of claim 1, further comprising:
ascertaining, for each posting list, for each element of the corresponding posting list, the contribution of the corresponding query term to the score of the document represented by the element.

7. The method of claim 1, further comprising:
for each posting list, sorting the corresponding elements according to the document identifier of each of the respective elements.

8. The method of claim 1, further comprising:
for each posting list, sorting the corresponding elements according to the contribution of the query term to the scores of the corresponding documents.

9. A system, comprising:
one or more servers;
the one or more servers including one or more processors and one or memories, the one or more servers being configured to:
obtain a set of query terms of a search query;
identify a list of documents pertaining to the set of query terms, wherein each document in the list of documents is identified by a document identifier, wherein each query term in the set of query terms has associated therewith a posting list of elements representing documents including the query term, wherein each element in the posting list indicates the corresponding document identifier and a contribution of the query term to a score of the document, and wherein each query term in the set of query terms has a corresponding term upper bound on its potential contribution to at least one document in the list of documents;
organize the list of documents using a tree data structure such that each of a plurality of nodes of the tree data structure represents a corresponding document heap of a plurality of document heaps; and
prune the list of documents to identify a subset of the list of documents, wherein pruning includes, for each query term in the set of query terms, skipping a document in the list of documents based, at least in part, on the contribution of the query term to the score of the corresponding document and a term upper bound for each other query term, in the set of query terms, that matches the document, wherein pruning includes traversing the tree data structure.

10. The system of claim 9, the one or more servers being further configured to:
for a query term in the set of query terms:
for an element in the corresponding posting list,
sum the contribution of the query term to the score of the corresponding document and a term upper bound for each other query term, in the set of query terms, that matches the document to ascertain a total; and
skip the element within the corresponding posting list according to whether the total is lower than a lowest document score of a set of top scored documents of the list of documents.

11. The system of claim 10, the one or more servers being further configured to:

update the set of top scored documents to include the document based, at least in part, on the total.

12. The system of claim 9, the one or more servers being further configured to:
for a query term in the set of query terms:
sum a term upper bound for each of the other query terms in the set of query terms to ascertain a total; and
skip an element within the corresponding posting list based, at least in part, on whether the total is lower than a lowest document score of a set of top scored documents of the list of documents.

13. The system of claim 9, each of the document heaps corresponding to a different set of one or more documents in the list of documents.

14. The system of claim 9, the one or more servers being further configured to:
ascertain, for each posting list, for each element of the corresponding posting list, the contribution of the corresponding query term to the score of the document represented by the element.

15. The system of claim 9, the one or more servers being further configured to:
for each posting list, sort the corresponding elements according to the document identifier of each of the respective elements.

16. The system of claim 9, the one or more servers being further configured to:
for each posting list, sort the corresponding elements according to the contribution of the query term to the scores of the corresponding documents.

17. A computer program product comprising one or more non-transitory computer-readable media having computer program instructions stored therein, the computer program instructions being configured such that, when executed by one or more computing devices, the computer program instructions cause the one or more computing devices to:
obtain a set of query terms of a search query;
identify a list of documents pertaining to the set of query terms, wherein each document in the list of documents is identified by a document identifier, wherein each query term in the set of query terms has associated therewith a posting list of elements representing documents including the query term, wherein each element in the posting list indicates the corresponding document identifier and a contribution of the query term to a score of the document, and wherein each query term in the set of query terms has a corresponding term upper bound on its potential contribution to at least one document in the list of documents;
organize the list of documents using a tree data structure such that each of a plurality of nodes of the tree data structure represents a corresponding document heap of a plurality of heaps of documents;
and
prune the list of documents to identify a subset of the list of documents, wherein pruning includes, for each query term in the set of query terms, skipping a document in the list of documents based, at least in part, on the contribution of the query term to the score of the corresponding document and a term upper bound for each other query term, in the set of query terms, that matches the document, wherein pruning includes traversing the tree data structure.

18. The computer program product of claim 17, the computer program instructions being further configured to:
for a query term in the set of query terms:
for an element in the corresponding posting list,
sum the contribution of the query term to the score of the corresponding document and a term upper bound for each other query term, in the set of query terms, that matches the document to ascertain a total; and
skip the element within the corresponding posting list according to whether the total is lower than a lowest document score of a set of top scored documents of the list of documents.

19. The computer program product of claim 17, the computer program instructions being further configured to:
generate an inverted index, the inverted index including, for each query term in the set of query terms, the associated posting list of elements representing documents including the query term;
wherein pruning includes traversing the inverted index.

20. The computer program product of claim 1, the computer program instructions being further configured to:
rank the subset of the list of documents such that a ranked list of documents is generated; and
responsive to the search query, provide search results including at least a portion of the ranked list of documents.

21. The computer program product of claim 17, the information associated with a corresponding document heap of the plurality of heaps of documents including a largest document identifier among all of the documents in the document heap.

22. The computer program product of claim 17, each of the documents in the document heap having the same score.

* * * * *